United States Patent
Judd et al.

(10) Patent No.: US 10,764,749 B2
(45) Date of Patent: Sep. 1, 2020

(54) SYSTEM AND METHOD FOR ENABLING EXTERNAL DEVICE CONNECTIVITY TO AVIONICS SYSTEMS

(71) Applicant: Honeywell International Inc., Morris Plains, NJ (US)

(72) Inventors: Thomas D. Judd, Woodinville, WA (US); Derek Mitchell, Kirkland, WA (US); Aloke Roy, Gaithersburg, MD (US)

(73) Assignee: Honeywell International Inc., Morris Plains, NJ (US)

( * ) Notice: Subject to any disclaimer, the term of this patent is extended or adjusted under 35 U.S.C. 154(b) by 260 days.

(21) Appl. No.: 15/937,304

(22) Filed: Mar. 27, 2018

(65) Prior Publication Data
US 2019/0306708 A1    Oct. 3, 2019

(51) Int. Cl.
| | | |
|---|---|---|
| H04L 29/06 | (2006.01) | |
| H04W 12/06 | (2009.01) | |
| H04W 4/40 | (2018.01) | |
| H04W 12/04 | (2009.01) | |
| H04B 7/185 | (2006.01) | |

(52) U.S. Cl.
CPC ........ *H04W 12/06* (2013.01); *H04B 7/18506* (2013.01); *H04L 63/029* (2013.01);
(Continued)

(58) Field of Classification Search
CPC ... H04W 12/06; H04W 4/40; H04W 12/0609; H04W 12/04; H04B 7/18506;
(Continued)

(56) References Cited

U.S. PATENT DOCUMENTS

| | | |
|---|---|---|
| 9,503,175 B2 | 11/2016 | Judd et al. |
| 9,800,665 B2 | 10/2017 | Uczekaj et al. |
| | (Continued) | |

FOREIGN PATENT DOCUMENTS

EP    3101536 A1    12/2016

OTHER PUBLICATIONS

European Patent Office, "Extended European Search Report from EP Application No. 19165044.9 dated Jul. 18, 2019", from Foreign Counterpart to U.S. Appl. No. 15/937,304, Page(s) 1-9, Published: EP.
(Continued)

Primary Examiner — Malcolm Cribbs
(74) Attorney, Agent, or Firm — Fogg & Powers LLC

(57) ABSTRACT

A method comprises: determining if a personal computing system in a vehicle is authentic using a radio system in the vehicle, where the radio system is configured (a) to communicate with at least one ground system and (b) to be coupled to a vehicle system; if the personal computing system is authenticated, creating a link between the personal computing system and the radio system; and at least one of: restricting data routing to and from at least one of: (a) vehicle system type(s), and (b) application program(s) of at least one of the vehicle system and the personal computing system; restricting data type(s) transmitted between the personal computing system and the vehicle system; and routing data between the personal computing system, and at least one of (a) at least one ground system not through a communications management system and (b) the vehicle system.

18 Claims, 3 Drawing Sheets

(52) U.S. Cl.
CPC ...... *H04L 63/0236* (2013.01); *H04L 63/0823* (2013.01); *H04L 63/1425* (2013.01); *H04W 4/40* (2018.02); *H04W 12/04* (2013.01); *H04W 12/0609* (2019.01); *H04L 63/0245* (2013.01); *H04L 63/0272* (2013.01)

(58) Field of Classification Search
CPC ............... H04L 63/0236; H04L 63/029; H04L 63/0823; H04L 63/1425; H04L 63/0245; H04L 63/0272
See application file for complete search history.

(56) References Cited

U.S. PATENT DOCUMENTS

| | | | |
|---|---|---|---|
| 2008/0181169 A1* | 7/2008 | Lauer | H04W 84/005 370/316 |
| 2012/0163376 A1* | 6/2012 | Shukla | H04L 49/357 370/388 |
| 2016/0344734 A1* | 11/2016 | Zulch, III | H04L 67/12 |
| 2017/0063789 A1* | 3/2017 | Marcinkowski | H04L 9/006 |
| 2017/0180212 A1* | 6/2017 | Fischer | H04L 41/12 |
| 2017/0295031 A1* | 10/2017 | Bush | H04L 63/02 |
| 2017/0353557 A1 | 12/2017 | Uczekaj et al. | |
| 2017/0366360 A9 | 12/2017 | Thompson et al. | |

OTHER PUBLICATIONS

Varet et al., "Design and Development of an Embedded Aeronautical Router with Security Capabilities", 2012, Page(s) 1-14, IEEE.

Wargo et al., "Security Considerations for the e-Enabled Aircraft", IEEE Aerospace Paper 1147, 2003, Page(s) 1-18, vol. 4-1533, IEEE.

Rockwell Collins, "Secure Server Router (SSR-7000), Electronic Flight Bag Interface and Communication Unit (EICU)", Dated 2016, pp. 1-2, Publisher: Rockwell Collins.

* cited by examiner

SYSTEM AND METHOD FOR ENABLING EXTERNAL DEVICE CONNECTIVITY TO AVIONICS SYSTEMS

BACKGROUND

Aircraft pilots are bringing portable computing systems on aircraft and desire to utilize applications on such personal computing system to perform aircraft related functions, e.g. to upload flight plans entered into a personal computing system to the aircraft's flight management system, to determine the center of gravity of the aircraft, and to communicate with others such as airline operations centers. Aircraft are not typically designed to facilitate connection between a personal computing system and aircraft systems. Therefore, there is a need to cost effectively facilitate a secure connection between allowed personal computing systems and aircraft systems.

SUMMARY

A program product is provided. The program product comprising a non-transitory processor-readable medium on which program instructions are embodied, wherein the program instructions are operable to: determine if a personal computing system in a vehicle is authentic using a radio system in the vehicle, where the radio system is configured (a) to communicate with at least one ground system and (b) to be coupled to a vehicle system; if the personal computing system is authenticated, create a link between the personal computing system and the radio system; and at least one of: restrict data routing, with the radio system, to and from at least one of: (a) vehicle system type(s), and (b) application program(s) of at least one of the vehicle system and the personal computing system; restrict, with the radio system, data type(s) transmitted between the personal computing system and the vehicle system; and route, with the radio system, data between the personal computing system, and at least one of (a) at least one ground system not through a communications management system and (b) the vehicle system.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
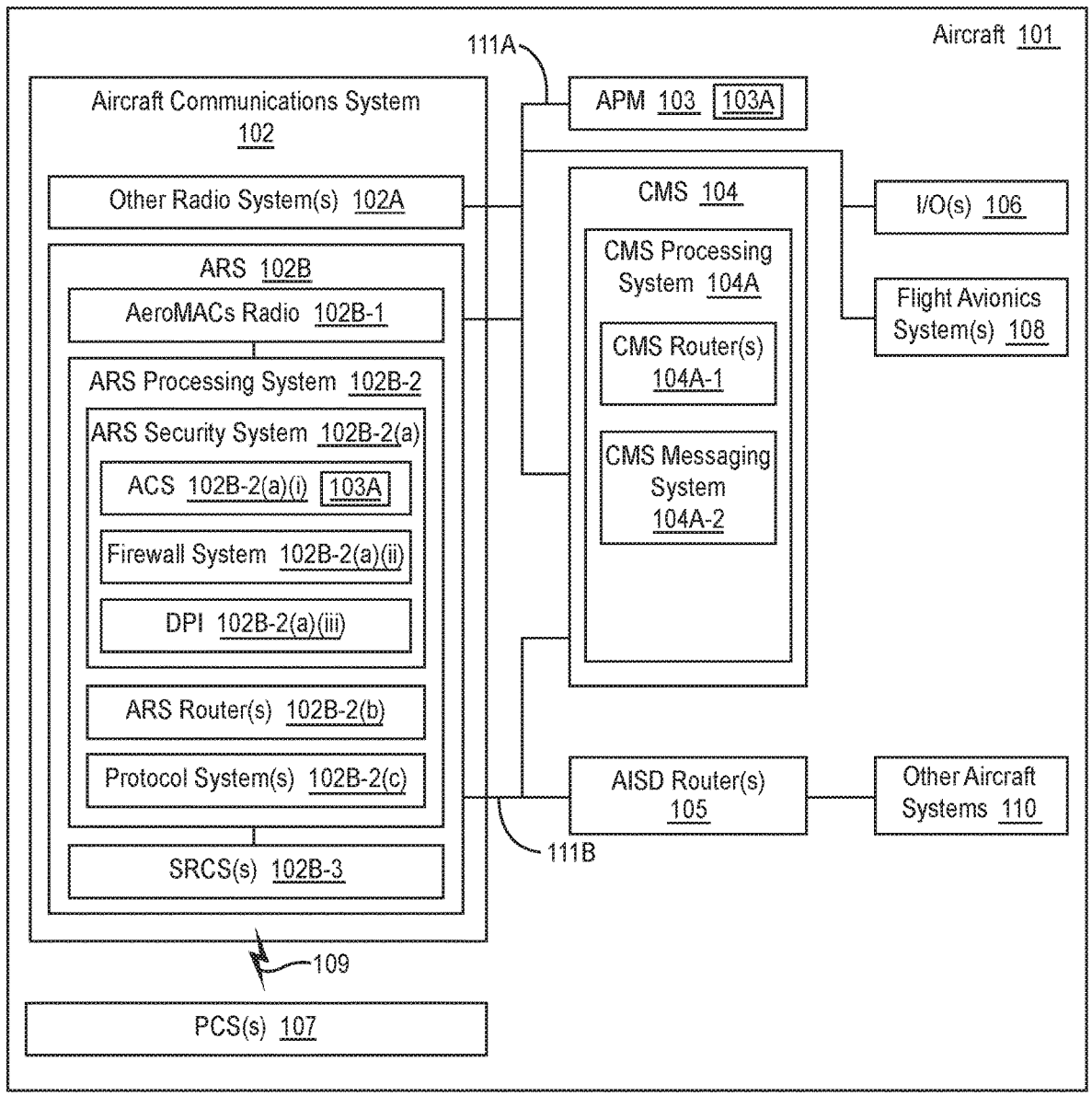
FIG. 1 illustrates a block diagram of one embodiment of an aircraft including an AeroMACS radio system configured to facilitate secure communications with a personal computing system.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

Airports are expected to deploy Aeronautical Mobile Airport Communications Systems (AeroMACS) worldwide. AeroMACS can be used to facilitate airport communications between an aircraft and ground systems in addition to ground-to-ground airport communications. AeroMACS utilizes IEEE802.16 standard, also known as WiMAX. WiMAX systems have longer ranges, of tens of miles, compared to IEEE802.11 compliant systems which have ranges of hundreds of feet. AeroMACS has a data rate of 5 to 7 Mbps which is more than one order of magnitude higher than the 31.5 kbps offered by aircraft VHF data radios utilizing VHF Datalink Mode 2. Although new aircraft can be built with AeroMACS radios, existing aircraft need to be retrofitted with AeroMACS radios to permit their use of AeroMACS at or proximate to airports.

To address the aforementioned problem related to portable computing systems, an AeroMACS radio system (ARS) installed in an aircraft includes an ARS short-range communications system which is used to facilitate communications with at least one personal computing system (PCS). Personal computing systems include tablets like iPads®, phablets, smart phones, and laptop computers. A personal computing system described herein may be used as an electronic flight bag (EFB). A personal computing system can be used to send and receive data respectively to and from aircraft system(s) and/or ground system(s). The personal computing system can also be used to execute applications to process data to be sent to and/or received from aircraft system(s) and/or ground system(s). For example, the personal computing system can send and receive data to ground system(s) using a short-range communications system and AeroMACs.

Each personal computing system includes a PCS short-range communications system which can form at least one communications link with the ARS short-range communications system. The personal computing system is not part of, i.e. a fixture of, the aircraft, and is brought on board the aircraft, e.g. by a pilot, other aircraft crew, aircraft maintenance personnel, etc. However, the aircraft may include a fixture, such as a docking station, which mechanically and electrically couples the personal computing system respectively to the aircraft and aircraft system(s).

The AeroMACS radio system also includes an ARS security system and at least one ARS router. The ARS short-range communications system is coupled to the ARS security system and at least one ARS router. The short-range communications system is a system configured to transmit and receive data within the aircraft, e.g. within the cockpit, or between another portion of the aircraft, such as the electronics equipment bay (EE Bay) and the cockpit; thus, for example, the short-range communications system is configured to have a range of less than one foot to less than one thousand feet.

To ensure that aircraft systems and data are not improperly accessed or misused, the short-range communications system utilizes the ARS security system. Alternatively, the short-range communications system may include and utilize its own security system. To ensure that data is properly directed to and from a personal computing system through the short-range communications system, at least one ARS router in the AeroMACS radio system is utilized. These systems shall be subsequently described in further detail.

Although an AeroMACS radio system is specifically described herein to implement personal computing system access to vehicle systems, other radio systems, e.g. a VHF data radio, an HF data radio, or a satellite communications (SatCom) system, could be used. However, for pedagogical reasons, an AeroMACS radio system will be subsequently described. The AeroMACS radio system and the other radio systems are coupled the avionics domain, e.g. to flight avionics system(s) 108 and a communications management system 104.

Flight avionics systems(s) 108 means at least one aircraft command, control, maintenance, surveillance, and/or communications system. A vehicle system means at least one vehicle command, control, maintenance, surveillance, and/or communications system. A control sub-system includes a guidance system. A surveillance sub-system includes weather RADAR or other system for sensing an environment around a vehicle. A command sub-system includes an autopilot system and/or flight management system. A maintenance sub-system includes a central maintenance computer and/or a condition monitoring system.

Although aircraft and avionics systems are specifically described herein, the invention is applicable to other types of vehicles, e.g. helicopters, spacecraft, ship, submarines, trains, automobiles, and trucks, and their respective vehicle systems. However, for pedagogical reasons, aircraft and avionics systems will be subsequently described. Thus, wherever 'aircraft' is mentioned, vehicle can be substituted in its place.

FIG. 1 illustrates a block diagram of one embodiment of an aircraft including an AeroMACS radio system configured to facilitate secure short-range communications with a personal computing system (aircraft) 101. The short-range communications means communications within the aircraft, e.g. within the cockpit, or between another portion of the aircraft, such as the electronics equipment bay (EE Bay) and the cockpit; thus, for example, the short-range communications are communications within a range of less than one foot to less than one thousand feet. The other communications systems (not the short-range communications systems) described herein have ranges between tens of miles to hundreds of miles.

In one embodiment, the aircraft 101 includes an aircraft communications system 102, a communications management system (CMS) 104, at least one input/output system (I/O(s)) 106, and at least one flight avionics system (flight avionics system(s)) 108. The I/O(s) 106 may include one or more multifunction display, multifunction control and display unit, touch screen display, keyboard, and cursor control device (e.g. a touch pad, mouse, or a joystick). In one embodiment, the flight avionics system(s) 108 includes a flight management system, a central maintenance computer, weather RADAR, a traffic computer, and/or other line replaceable units or systems.

If the flight avionics system(s) 108 includes a flight management system, the flight management system is primarily used to provide in-flight management of the aircraft's flight plan during transit. Using information from sensors on the aircraft, the flight management system determines the aircraft's position and guides the aircraft along the flight plan. The flight management system provides such information to the crew of the aircraft through the I/O(s) 106. However, optionally, the flight management system (e.g. through a FANS 1/A and/or other applications) facilitates creation, transmission, receipt, and display of messages using, e.g. aircraft communications addressing and reporting system (ACARS) protocol. However, alternatively or additionally, FANS 1/A and/or other applications for creating, sending, receiving, and displaying messages in ACARS and/or other communications protocols may be within the communications management system 104.

Such messages are routed by the communications management system 104, and respectively transmitted and received by the aircraft communications system 102. The messages may comprise air traffic control (ATC) messages, airline operational control (AOC) messages, and airline administrative control (AAC) messages. Optionally, such ATC, AOC, and AAC messages may also be sent and received by the subsequently described CMS messaging system in the communications management system 104.

The AOC and AAC messages are provided by the aircraft 101 to at least one airline operations center or system (AiOC(s)) include notification of an aircraft's departure from a gate, arrival to a gate, takeoff and landing, e.g. triggered by aircraft sensors, e.g. door and parking brake sensors. ADS-C messages, which are a type of ATC message, are periodically provided by the aircraft 101 to at least one air traffic control center or system (ATCC(s)), and include an aircraft identifier, 3-D position, a time stamp, and an indication of navigation figure of merit or accuracy. The ADS-C messages may also include ground speed, air speed, heading, vertical rate, next waypoint, and meteorological information. ATC messages may be communicated using controller-pilot datalink communications (CPDLC).

Returning to FIG. 1, that figure illustrates an aircraft 101 comprising a portable communications system 107. However, this is for illustrative purposes only. As discussed above, the portable communications system 107 is not part of the aircraft 101. Rather it is a portable device which may be brought on board the aircraft, e.g. into the cockpit by pilot(s).

In the illustrated embodiment, the communications management system 104 is coupled to the aircraft communications system 102, the aircraft personality module 103, the I/O(s) 106, and the flight avionics system(s) 108 by at least one first data bus (first data bus(es)) 111A. In one embodiment, the first bus(es) 111A are coupled to each of the AeroMACS radio system 102B, e.g. the ARS processing system 102B-2, and the other radio system(s) 102A. In one embodiment, the first bus(es) 111A comprises an ARINC429 compliant data bus; however, other buses, such as an Ethernet networking system, may be used.

The communications system 102 includes at least one other radio system (other radio system(s)) 102A and the AeroMACS radio system (ARS) 102B coupled to the communications management system 104 and the flight avionics system(s) 108. The other radio system(s) 102A include one or more of an HF radio, a VHF radio, and a satellite communications radio. Each communication system includes necessary antenna(s) or optics. Optionally, the communications system 102 may include a separate radio system, e.g. a SatCom radio system, dedicated to the information domain, e.g. other aircraft systems 110. The separate radio system may be used to facilitate passenger data communications, e.g. Email, web browsing, and entertainment programming.

The AeroMACS radio system 102B includes an AeroMACS radio 102B-1, an ARS processing system 102B-2, and at least one short-range communications system (short-range communications system(s) or SRCS(s)) 102B-3. In one embodiment, the AeroMACS radio 102B-1 and the short-range communications system(s) 102B-3 are each coupled to the ARS processing system 102B-2.

The short-range communications system(s) 102B-3 may include one or more of an IEEE802.11 compliant radio system, a Bluetooth radio system, Wireless Avionics Intra-Communications (WAIC) system, a free space optical radio system e.g. using infrared wavelengths, and/or a near field communications system. The short-range communications system(s) 102B-3 and the personal computing system 107 can form a short-range data connection 109. The short-range data connection 109 can be secure as will be subsequently described. Also as described elsewhere herein, data, e.g. messages, are exchanged over the short-range data connection 109 between the short-range communications system(s) 102B-3 and the personal computing system 107.

The ARS processing system 102B-2 is a state machine implemented by processor circuitry comprising one or more of a microprocessor circuits, microcontroller circuits, digital signal processor circuits, application specific integrated circuits, and/or a field programmable gate arrays. The memory circuitry may comprise one or more of dynamic random access memory circuits, Flash memory circuits, magnetic memory drives, and/or optical memory drives.

The ARS processing system 102B-2 includes an ARS security system **102B-2(*a*) and at least one ARS router (ARS router(s)) 102B-2(*b*). Optionally, the ARS processing system 102B-2 includes at least one protocol system or stack (protocol system(s) or stack(s)) 102B-2(*c*). The protocol system(s) 102B-2(*c*)** comprise protocol converters to modify data protocols, e.g. to or from data bus protocols such as the ARINC429 protocol and/or the Ethernet protocol.

In one embodiment, the ARS security system **102B-2(*a*), the ARS router(s) 102B-2(*b*), and the protocol system(s) 102B-2(*a*) are programs implemented by program instructions stored in the memory circuitry and executed by the processor circuitry. The AeroMACS radio 102B-1 and the short-range communications system 102B-3 are communicatively coupled to a security system 102B-2(*a*) and the ARS router(s) 102B-2(*b*)**.

Optionally, the security system **102B-2(*a*) includes an authentication and confidentiality system (ACS) 102B-2(*a*)(*i*) that is used to authenticate endpoints coupled to the AeroMACS radio 102A-1 or the short-range communications system 102A-4, and to create secure communications, e.g. a secure socket layer (SSL), between the communicating entities. An endpoint may be a personal computing system 107, a ground system, or an aircraft system. For example, for the short-range communications system(s) 102B-3, the end point(s) are personal computing system(s) 107. Thus, the authentication and confidentiality system 102B-2(*a*)(*i*) can be used to secure the short-range data connection 109**.

In one embodiment, the authentication and confidentiality system **102B-2(*a*)(*i*) includes at least one security certificate and private key stored 103A, e.g. transmitted from the aircraft personality module 103 to the AeroMACS radio system 102B. In this embodiment, the authentication and confidentiality system 102B-2(*a*)(*i*)** performs standard certificate-based authentication, e.g.:

a. determining whether the certificate is signed by a trusted certificate authority;
b. determining whether the certificate is time valid such as by checking the start and end dates of the certificate;
c. determining whether the certificate has been revoked such as by analyzing the certificate revocation lists of the corresponding certificate authority or by making an online certificate status protocol (OCSP) inquiry to a corresponding OCSP responder; and/or
d. determining proof of possession by verifying that the alleged certificate owner is in possession of corresponding encryption key(s).

The authentication and confidentiality system **102B-2(*a*)(*i*) ensures that only certain personal computing systems can communicate with the communications system 102, and hence to systems on the aircraft 101. This prevents malicious actors from accessing aircraft avionics systems. This is accomplished using security certificates, e.g. as described above. For example, the public key security system 102A-2(*a*) can validate a security certificate of a personal computing system 107 corresponds to an authorized personal computing system, personal computing system owner, and/or user (e.g. a pilot). Alternatively, or additionally, a logon name and/or password may be required to be entered by the personal computing system or its user to form a communications link with the communications system 102**.

Additionally, the authentication and confidentiality system **102B-2(*a*)(*i*) facilitates secure communications, e.g. using SSL, TLS, or a virtual private network (VPN) tunnel, and public and private keys, between an end point, such as a personal computing system 107, and the communications system 102A. This prevents malicious actors from tampering with data communications between the end point and the communications system 102A (and thus a system of the aircraft 101 coupled to the communications system 102A**).

Optionally, the ARS security system **102B-2(*a*) includes a firewall system 102B-2(*a*)(*ii*). The firewall system 102B-2(*a*)(*ii*) restricts, even for authenticated endpoints, the aircraft system(s) and/or application program(s) (executed by aircraft system(s) and/or personal computing system(s) 107) with which the endpoint can communicate. Thus, even if a malicious actor secures a personal computing system 107 with a security certificate, security certificate, and/or logon credentials that provide access to the communications system 102**, and thus aircraft system(s) coupled thereto, the malicious actor will be limited as to the type of aircraft equipment, applications, and data that can be accessed.

Optionally, the firewall restricts data transmission at the network layer, e.g. using Transport Control Protocol (TCP) and/or User Datagram Protocol (UDP)/IP port filtering, i.e. filtering based upon port numbers and/or IP addresses in TCP, UDP and/or IP headers in TCP or UDP segments and/or IP packets. The port numbers and/or IP addresses are uniquely related to different aircraft equipment and/or application program(s) running thereon. By restricting access to certain systems and applications, the firewall system **102B-2(*a*)(*ii*)** regulates the type of data that can flow between endpoints or applications executing on those endpoints.

Optionally, the ARS security system **102B-2(*a*) includes a deep packet inspection system (DPI) 102B-2(*a*)(*iii*). Even if a malicious actor is able to inappropriately access prohibited endpoint (e.g. an aircraft system) or application program running thereon, e.g. through an improper open port, the deep packet inspection system 102B-2(*a*)(*iii*)** monitors the underlying data being sent to and from the endpoint or application program. Based on analyzing the data, the deep packet inspection system 102B-2(*a*)(*iii*) determines whether such data communications are permitted or not allowed. If the deep packet inspection system 102B-2(*a*)(*iii*) determines that the data communications are permitted, then it allows the data communications to continue to and from the endpoint or application program. If the deep packet inspection system 102B-2(*a*)(*iii*) determines that the data communications are not permitted, then is stops the data communications to and from the endpoint or application program.

Optionally, deep packet inspection can be implemented by an intrusion detection system and an intrusion prevention system, and/or port mirroring. An intrusion detection system monitors for malicious activity or policy violations (e.g. security policy violations), and may issue an alert upon detecting such activity or violations. Intrusion detection may use signature based detection, statistical anomaly based detection, and/or stateful protocol analysis detection. An intrusion prevention system monitors for malicious activity or policy violations, and seeks to stop or block intrusion attempts; however, the intrusion prevention system may also issue an alert upon detecting such activity or violations. Optionally, intrusion prevention utilizes behavior analysis that identifies unusual traffic flows corresponding to malicious activities.

The ARS security system 102B-2(*a*) may include logging of potential security threat events detected, e.g. by the firewall system 102B-2(*a*)(*ii*) and/or the deep packet inspection system 102B-2(*a*)(*iii*), including recording the source(s) of the threats, the intended affect(s) of the threats, and any action(s) taken by the ARS security system 102B-2(*a*). Such event logs may later be monitored to evaluate the potential security threat events and the corresponding performance of the ARS security system 102B-2(*a*).

Each of the ARS router(s) 102B-3 is configured to route data, e.g. messages at the frame and packet level respectively for ACARS, aeronautical telecommunications network (ATN)/open systems international (OSI) and ATN/Internet Protocol (IP) protocols. Data is routed between endpoints. The communications management unit 104 may also assist in routing such data to certain aircraft equipment, e.g. the I/O(s) 106 and flight avionics system(s) 108. Ground system end points, or ground systems, include at least one air traffic control center, at least one airline operations center, at least one maintenance operations centers or systems (MOC(s)), at least one ground data centers or systems (GDC(s)), at least one ground handling services centers or systems (GHSC(s)), and/or at least one system wide information management systems (SWIM(s)).

In one embodiment, the ARS router(s) 102B-3 includes separate routers for different protocols, such as IP, ACARS, ATN/OSI, and ATN/IP. In another embodiment, the relay and routing functionality of each of the second router(s) 102A-3 is accomplished by a routing table or policy within the corresponding router. In yet another embodiment, a single router may be used to route messages of two or more protocols.

Data, e.g. messages and informational data, may be communicated in a variety of ways using the system illustrated in FIG. 1. Informational data includes non-message data generated by flight avionics system(s) 108 and/or a personal computing system 107. Data may be sent to and/or from flight avionics system(s) 108. Data may be sent to and/or from a personal computing system 107. Optionally, data may be sent to and from other aircraft systems 110. Data may be exchanged between the aircraft 101 and ground systems or centers through a terrestrial AeroMACS radio system. For example, a message can be sent from a personal computing system 107 to a ground station (a) through the short-range communication system 102B-3 and the ARS processing system 102B-2(*a*), (b) through the communications management system 104, and (c) through a radio system (e.g. the AeroMACS radio system 102B or another radio system.). A message from a ground station can be sent to the personal communications system 107 in the reverse direction.

Firstly, data may be communicated between a personal computing system 107 and at least one aircraft system (aircraft system(s)). Aircraft system(s) as used herein includes the communications management system 104, the I/O(s) 106, the flight avionics system(s) 108 (e.g. a flight management system), and/or other aircraft systems 110; such data communications may be made through the communications management system 104. Secondly, such data may be communicated between a personal computing system 107 and at least one ground system (ground system(s)) through the AeroMACS radio system 102A without utilizing the communications management system 104. Thirdly, such data may be communicated between a personal computing system 107 or aircraft systems, and ground system(s) through the communications management system 104 utilizing radio(s), including possibly the AeroMACS radio 102B-1, in the communications system 102.

Optionally, data communicated from a personal computing system 107 to the communications system 102, e.g. to be communicatively coupled to the communications management system 104 or flight avionics system(s) 108, is first processed by the ARS security system 102B-2(*a*), and then the ARS router(s) 102B-2(*b*). In one embodiment, such data is first processed in the ARS security system 102B-2(*a*) by the firewall system 102A-2(*b*). If the data is passed by the firewall system 102A-2(*b*), then it is processed by the deep packet inspection system 102A-2(*c*). If the data is passed by the deep packet inspection system 102A-2(*c*), then it is processed by the ARS router(s) 102B-2(*b*). Data provided from external systems (e.g. ground systems) communicatively coupled to the AeroMACS radio 102B-1 and then to a personal computing system 107 is typically only processed by the ARS router(s) 102B-2(*b*) and possibly by the authentication and confidentiality system 102B-2(*a*)(*i*), and not the other components of the ARS security system 102B-2(*a*); however, if the personal computing system 107 directs such data to aircraft equipment, such as the I/O(s) 106 and/or the flight avionics system(s) 108, the data is then processed by the firewall system 102A-2(*b*) and the deep packet inspection system 102A-2(*c*) as described above.

The communications management system 104 is configured to facilitate two-way air-ground datalink communications. The communications management system 104 is configured to route datalink communications, e.g. air traffic control messages, airline operational control messages, and airline administrative control messages, between, e.g., a flight management system, the communications management system 104, and/or the other aircraft systems 110, and ground endpoints. The ground end points include one or more of at least one air traffic control center or system, at least one airline operations center or system, at least one maintenance operations center or system, at least one ground data center or system, at least one ground handling service center or system, and/or at least one system wide information management system. The communications management system 104 routes such messages through one or more radio systems in the aircraft communications system 102.

In the illustrated embodiment, the communications management system 104 includes a CMS processing system 104A. The CMS processing system is a state machine implemented by processor circuitry comprising one or more of a microprocessor circuits, microcontroller circuits, digital signal processor circuits, application specific integrated circuits, a field programmable gate arrays, and memory circuitry. The memory circuitry may comprise one or more of dynamic random access memory circuits, a Flash memory circuits, a magnetic memory drives, and/or an optical memory drives.

Optionally, the CMS processing system 104A includes at least one CMS router (CMS router(s)) 104A-1 and a CMS messaging system 104A-2. In one embodiment, the CMS router(s) 104A-1 and the CMS messaging systems 104A-2 are programs implemented by program instructions stored in the memory circuitry and executed by the processor circuitry.

Each of the CMS router(s) 104A-1 is configured to relay and route data, e.g. messages at a frame and packet level respectively in ACARS, ATN/OSI and ATN/ IP protocols, between the communications management system 104, flight avionics system(s) 108, e.g. the flight management system, and/or the PCS 107, and ground end points. Optionally, the relay and routing functionality of each of the CMS router(s) 104A-1 is implemented with a routing table or policy within the corresponding router. In yet another embodiment, a single router may be used to route messages of two or more protocols.

The aircraft personality module 103 is hardware that includes memory circuitry and stores data in the memory circuitry pertaining to the aircraft and its equipment; such equipment data can be used to configure the corresponding equipment such as an aircraft communications system 102. Typically, the aircraft personality module 103 remains affixed in the aircraft 101. Optionally, rather than having a single aircraft personality module 103 as shown in FIG. 1, each of the communications management system 104 and the AeroMACS radio system 102B include their own aircraft personality module; further, optionally, other aircraft system could include their own aircraft personality module.

Optionally, the aircraft personality module 103 includes at least one security certificate and private key stored 103A in the memory circuitry. Each security certificate includes a public key and other data, e.g. the expiration date of the certificate, the owner and issuer of the security certificate, and how to validate the security certificate, for example as defined by the X.509 standard or as further defined by RFC 5280. Optionally, a security certificate can be loaded from the aircraft personality module 103 to corresponding equipment, e.g. an AeroMACS radio system 102B over the first bus(es) 111A, to facilitate secure communications by that equipment.

Optionally, as illustrated in FIG. 1, the aircraft 101 may include a at least one second data bus (second data bus(es)) 111B. In one embodiment, the second bus(es) 111B comprise an Ethernet networking system; however other buses such as an ARINC429 compliant data bus are also feasible. The second data bus(es) 111B is illustrated coupling the aircraft communications system 102B, e.g. the AeroMACS radio system 102B, to at least one aircraft information services domain (AISD) router (AISD router(s)) 105. However, the second data bus(es) 111B can be coupled additionally or alternatively to the other radio system(s) 102A. The AISD router(s) are 105 are coupled to the other aircraft systems 110. The other aircraft systems 110 may include data connectivity systems, e.g. Wi-Fi networks, and infotainment systems for cabin passengers. In another embodiment, to ensure enhance security, data conveyed to and from the second data bus(es) 111B is coupled to the ARS security system 102B-2(*a*) prior to being coupled, e.g. to the ARS router(s) 102B-2(*b*); this may be particularly desirable when the second bus(es) 111B comprise an Ethernet networking system. Further, optionally, the communications management system 104 may be coupled to the AeroMACS radio system 102B by the second data bus(es) 111B in addition to or in lieu of the first data bus(es) 111A.

Figure 2:
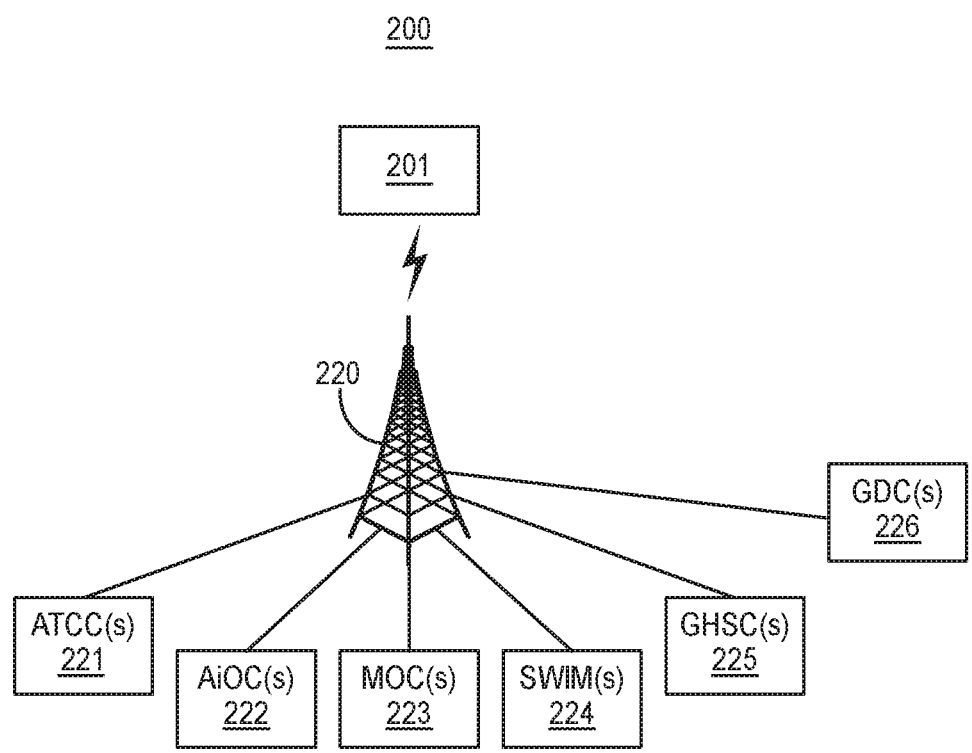
FIG. 2 illustrates a block diagram of one embodiment of a network comprising an aircraft including an AeroMACS radio system configured to facilitate secure communications with a personal computing system in communications with a terrestrial AeroMACS radio system.

FIG. 2 illustrates a block diagram of one embodiment of a network comprising an aircraft including an AeroMACS radio system configured to facilitate secure communications with a personal computing system in communications with a terrestrial AeroMACS radio system (network) 200. In one embodiment, the aircraft including an AeroMACS radio system configured to facilitate secure communications with a personal computing system (aircraft) 201 is as described above.

The aircraft 201, and its AeroMACS radio system, when in range, is communicatively coupled to a terrestrial AeroMACS radio system 220. In one embodiment, the terrestrial AeroMACS radio system 220 is at or proximate to an airport (or terminal) that is the destination of the aircraft. The terrestrial AeroMACS radio system 220 is communicatively coupled to one or more of one or more of at least one air traffic control center or system 221, at least one airline operations center or system 222, at least one maintenance operations center or system (MOC(s)) 223, at least one ground data center or system 224, at least one ground handling service center or system (GHSC(s)) 225, and/or at least one system wide information management system (SWIM(s)) 226.

Each air traffic control center is configured to transmit and receive air traffic control messages such as ADS-C messages. Each airline operations center is configured to transmit and receive AOC and/or AAC messages. Each maintenance operations center is configured to transmit and/or receive maintenance messages, e.g. to and from the central maintenance computer of the aircraft 201. Each ground data center is configured to transmit and/or receive messages pertaining to flight planning and/or weather services. Each ground handling service center is configured to transmit and/or receive message pertaining to cargo and baggage loading and/or unloading, fuel services, catering services, and/or cleaning services. Each system wide information management system is configured to transmit and/or receive messages pertaining to aircraft traffic, weather, and related notices to airman (e.g. proximate to the aircraft or in its future flight path).

Figure 3:
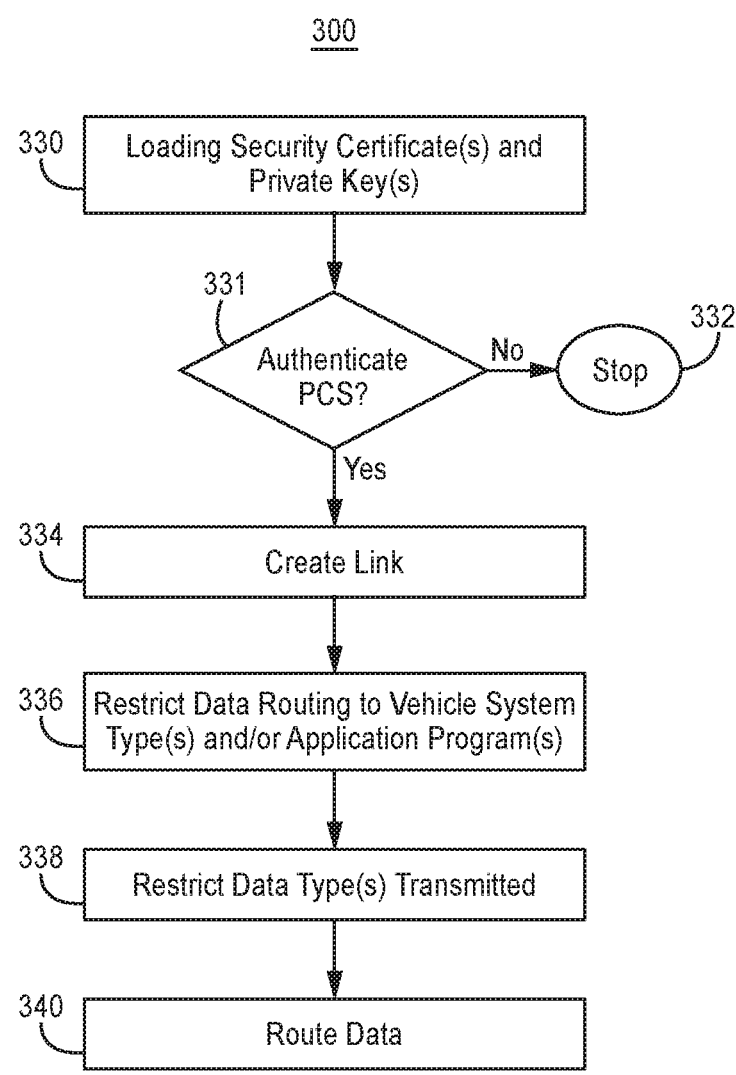
FIG. 3 illustrates one embodiment of a method for communicating between a personal computing system and an AeroMACS radio system.

FIG. 3 illustrates one embodiment of a method 300 for communicating between a personal computing system and an AeroMACS radio system. To the extent that the embodiment of method 300 shown in FIG. 3 is described herein as being implemented in the systems shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

Optionally, in block 330, load at least one security certificate and private key, e.g. from the aircraft personality module into AeroMACS radio system, e.g. the ARS security system or more particularly the authentication and confidentiality system. In block 331, determine if a personal computing system is authentic using the AeroMACS radio system (in the aircraft), e.g. using certificate authentication. The AeroMACS the radio system is configured (a) to communicate with at least one ground system and (b) to be coupled to a communications management system. If the personal computing system is authenticated, then, in block 334, create a link between the personal computing system and the AeroMACS radio system. Optionally, create an encrypted link between the personal computing system and the AeroMACS radio system. If the personal computing system is not authenticated, then, in block 332, stop. If proceeding from block 334, then continue as follows.

Optionally, in block 336, restrict data routing, with the AeroMACS radio system, to and from at least one of: (a) at least one type of vehicle system (vehicle system type(s)), and (b) at least one application program (application program(s)) of at least one of at least one vehicle system and the personal computing system. Thus, data can be sent and received from only certain vehicle systems, and certain application program(s) of vehicle system(s) and/or the personal computing system. Optionally, in block 338, with the AeroMACS radio system, restrict at least one type of data (data type(s)) transmitted between the personal computing system and the at least one vehicle system. Optionally, in block 340, route, with the radio system, data between the personal computing system, and at least one of (a) the at least one ground system not through the communications management system and (b) at least one vehicle system.

The present method can be implemented by computer executable instructions, such as program modules or components, which are executed by processor circuit(s). Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media, e.g. illustrated herein, that can be accessed by a general purpose or special purpose computer or processor, or any other device.

Suitable computer readable media may include storage or memory media such as magnetic or optical media. For example, storage or memory media may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory). Combinations of the above are also included within the scope of computer readable media.

Example Embodiments

Example 1 includes a method, comprising: determining if a personal computing system in a vehicle is authentic using a radio system in the vehicle, where the radio system is configured (a) to communicate with at least one ground system and (b) to be coupled to a vehicle system; if the personal computing system is authenticated, creating a link between the personal computing system and the radio system; and at least one of: restricting data routing, with the radio system, to and from at least one of: (a) vehicle system type(s), and (b) application program(s) of at least one of the vehicle system and the personal computing system; restricting, with the radio system, data type(s) transmitted between the personal computing system and the vehicle system; and routing, with the radio system, data between the personal computing system, and at least one of (a) at least one ground system not through a communications management system and (b) the vehicle system.

Example 2 includes the method of Example 1, wherein determining if the personal computing system is authentic comprises determining if a personal computing system is authentic using certificate-based authentication.

Example 3 includes the method of any of Examples 1-2, wherein restricting which data can be routed comprises restricting which data can be routed using at least one of Transport Control Protocol (TCP) port filtering, User Datagram Protocol (UDP) port filtering, and IP address filtering.

Example 4 includes the method of any of Examples 1-3, wherein restricting the type of data comprises restricting type of data using behavioral analysis.

Example 5 includes the method of any of Examples 1-4, wherein routing the data comprises routing data using at least one of a routing table and a routing policy.

Example 6 includes the method of any of Examples 1-5, wherein determining if the personal computing system is authentic using the radio system in the vehicle comprises determining if a personal computing system is authentic using an AeroMACS radio system in an aircraft.

Example 7 includes the method of any of Examples 1-6, wherein creating the link comprises creating a link using at least one of a secure socket layer, a transport layer security, and a virtual private network tunnel.

Example 8 includes the method of any of Examples 1-7, further comprising loading at least one security certificate and private key.

Example 9 includes a program product comprising a non-transitory processor-readable medium on which program instructions are embodied, wherein the program instructions are operable to: determine if a personal computing system in a vehicle is authentic using a radio system in the vehicle, where the radio system is configured (a) to communicate with at least one ground system and (b) to be coupled to a vehicle system; if the personal computing system is authenticated, create a link between the personal computing system and the radio system; and at least one of: restrict data routing, with the radio system, to and from at least one of: (a) vehicle system type(s), and (b) application program(s) of at least one of the vehicle system and the personal computing system; restrict, with the radio system, data type(s) transmitted between the personal computing system and the vehicle system; and route, with the radio system, data between the personal computing system, and at least one of (a) at least one ground system not through a communications management system and (b) the vehicle system.

Example 10 includes the program product of Example 9, wherein determining if the personal computing system is authentic comprises determine if a personal computing system is authentic using certificate-based authentication.

Example 11 includes the program product of any of Examples 9-10, wherein restrict which data can be routed comprises restrict which data can be routed using at least one of Transport Control Protocol (TCP) port filtering, User Datagram Protocol (UDP) port filtering, and IP address filtering.

Example 12 includes the program product of any of Examples 9-11, wherein restrict the type of data comprises restrict type of data using behavioral analysis.

Example 13 includes the program product of any of Examples 9-12, wherein route the data comprises route data using at least one of a routing table and a routing policy.

Example 14 includes the program product of any of Examples 9-13, wherein determine if the personal computing system is authentic using the radio system in the vehicle comprises determine if a personal computing system is authentic using an AeroMACS radio system in an aircraft.

Example 15 includes the program product of any of Examples 9-14, wherein create the link comprises create a link using at least one of a secure socket layer, a transport layer security, and a virtual private network tunnel.

Example 16 includes the program product of any of Examples 9-15, further comprising load at least one security certificate and private key.

Example 17 includes a radio system, comprising: wherein the radio system is configured to be installed in a vehicle and coupled to a vehicle system in the vehicle; a radio processing system comprising processor circuitry coupled to memory circuitry; wherein the at least one memory circuitry comprises a radio security system and at least one radio router; a radio coupled to the radio processing system, where the radio is configured to communicate with at least one ground system; at least one short-range communications system coupled to the radio processing system; wherein the radio processing system is configured to: determine if a personal computing system in the vehicle is authentic; if the personal computing system is authenticated, create a link between the personal computing system and the radio system; and at least one of: restrict data routing, with the radio system, to and from at least one of: (a) vehicle system type(s), and (b) application program(s) of at least one the vehicle system and the personal computing system; restrict data type(s) transmitted between the personal computing system and the vehicle system; and route data between the personal computing system, and at least one of (a) at least one ground system not through a communications management system and (b) the vehicle system.

Example 18 includes the system of Example 17, wherein the radio security system comprises at least one of: an authentication and confidentiality system; a firewall system; and a deep packet inspection system.

Example 19 includes the system of any of Examples 17-18, wherein the authentication and confidentiality system comprises at least one security certificate and private key.

Example 20 includes the radio system of any of Examples 17-19, wherein the radio is an AeroMACS radio.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
   determining if a personal computing system in a vehicle is authentic using a radio system in the vehicle, where the radio system is configured (a) to communicate with at least one ground system and (b) to be coupled to at least one vehicle system;
   when the personal computing system is authenticated, creating a link between the personal computing system and the radio system; and
   upon creating the link, then:
      restricting data routing, with the radio system, to and from at least one of:
      (a) at least one vehicle system type, and (b) at least one application program of at least one of the at least one vehicle system and the personal computing system;
      restricting, with the radio system, at least one data type transmitted between the personal computing system and the at least one vehicle system; and
      routing, with a routing table or a routing policy in the radio system, data between the personal computing system, and at least one of (a) the at least one ground system not through a communications management system and (b) the at least one vehicle system.

2. The method of claim 1, wherein determining if the personal computing system is authentic comprises determining if a personal computing system is authentic using certificate-based authentication.

3. The method of claim 1, wherein restricting which data can be routed comprises restricting which data can be routed using at least one of Transport Control Protocol (TCP) port filtering, User Datagram Protocol (UDP) port filtering, and IP address filtering.

4. The method of claim 1, wherein restricting the type of data comprises restricting type of data using behavioral analysis.

5. The method of claim 1, wherein determining if the personal computing system is authentic using the radio system in the vehicle comprises determining if a personal computing system is authentic using an Aeronautical Mobile Airport Communications Systems (AeroMACS) radio system in an aircraft.

6. The method of claim 1, wherein creating the link comprises creating a link using at least one of a secure socket layer, a transport layer security, and a virtual private network tunnel.

7. The method of claim 1, further comprising loading at least one security certificate and private key.

8. A program product comprising a non-transitory processor-readable medium on which program instructions are embodied, wherein the program instructions are operable to:
   determine if a personal computing system in a vehicle is authentic using a radio system in the vehicle, where the radio system is configured (a) to communicate with at least one ground system and (b) to be coupled to at least one vehicle system;
   when the personal computing system is authenticated, create a link between the personal computing system and the radio system; and
   upon creating the link, then:
      restrict data routing, with the radio system, to and from at least one of: (a) at least one vehicle system type, and (b) at least one application program of at least one of the at least one vehicle system and the personal computing system;
      restrict, with the radio system, at least one data type transmitted between the personal computing system and the at least one vehicle system; and
      route, with a routing table or a routing policy in the radio system, data between the personal computing system, and at least one of (a) the at least one ground system not through a communications management system and (b) the at least one vehicle system.

9. The program product of claim 8, wherein determining if the personal computing system is authentic comprises determine if a personal computing system is authentic using certificate-based authentication.

10. The program product of claim 8, wherein restrict which data can be routed comprises restrict which data can be routed using at least one of Transport Control Protocol (TCP) port filtering, User Datagram Protocol (UDP) port filtering, and IP address filtering.

11. The program product of claim 8, wherein restrict the type of data comprises restrict type of data using behavioral analysis.

12. The program product of claim 8, wherein determine if the personal computing system is authentic using the radio system in the vehicle comprises determine if a personal computing system is authentic using an Aeronautical Mobile Airport Communications Systems (AeroMACS) radio system in an aircraft.

13. The program product of claim 8, wherein create the link comprises create a link using at least one of a secure socket layer, a transport layer security, and a virtual private network tunnel.

14. The program product of claim 8, wherein the program instructions are further operable to load at least one security certificate and private key.

15. A radio system, comprising:
   wherein the radio system is configured to be installed in a vehicle and coupled to at least one vehicle system in the vehicle;
   a radio processing system comprising processor circuitry coupled to memory circuitry;
   wherein the at least one memory circuitry comprises a radio security system and at least one radio router;
   a radio coupled to the radio processing system, where the radio is configured to communicate with at least one ground system;
   at least one short range communications system coupled to the radio processing system;
   wherein the radio processing system is configured to:
      determine if a personal computing system in the vehicle is authentic;
      when the personal computing system is authenticated, create a link between the personal computing system and the radio system; and
      upon creating the link, then:
         restrict data routing, with the radio system, to and from at least one of: (a) at least one vehicle system type, and (b) at least one application program of at least one of at least one of the at least one vehicle system and the personal computing system;
         restrict at least one data type transmitted between the personal computing system and the at least one vehicle system; and
         route with a routing table or a routing policy, data between the personal computing system, and at least one of (a) the at least one ground system not through a communications management system and (b) the at least one vehicle system.

16. The system of claim 15, wherein the radio security system comprises at least one of:
   an authentication and confidentiality system;
   a firewall system; and
   a deep packet inspection system.

17. The system of claim 15, wherein the authentication and confidentiality system comprises at least one security certificate and private key.

18. The radio system of claim 15, wherein the radio is an Aeronautical Mobile Airport Communications Systems (AeroMACS) radio.

* * * * *